United States Patent [19]

Sonobe

[11] Patent Number: 4,953,150
[45] Date of Patent: Aug. 28, 1990

[54] OPTICAL RECORDING APPARATUS HAVING IMPROVED ERASING CAPABILITY

[75] Inventor: Hiraku Sonobe, Yokohama, Japan

[73] Assignee: Canon Kabushiki Kaisha, Tokyo, Japan

[21] Appl. No.: 304,908

[22] Filed: Feb. 2, 1989

Related U.S. Application Data

[63] Continuation of Ser. No. 21,554, Mar. 2, 1987, abandoned, which is a continuation of Ser. No. 739,489, May 30, 1985, abandoned, which is a continuation of Ser. No. 420,732, Sep. 21, 1982, abandoned.

[30] Foreign Application Priority Data

Nov. 9, 1981 [JP] Japan ................. 56-179423

[51] Int. Cl.$^5$ .............................................. G11B 11/14
[52] U.S. Cl. ..................................... 369/13; 360/114; 369/100; 369/116
[58] Field of Search ............... 369/100, 106, 111, 112, 369/116, 121, 113; 250/201, 202; 350/6.4; 365/127, 124; 346/1.1; 219/121 LV, 121 LU, 121 LN, 121 LW; 360/114

[56] References Cited

U.S. PATENT DOCUMENTS

| | | | |
|---|---|---|---|
| 3,736,046 | 5/1973 | Zook | 365/122 X |
| 3,736,848 | 6/1973 | Tsuneta et al. | 350/64 |
| 3,778,785 | 12/1973 | von Gutfeld | 365/113 |
| 4,125,860 | 11/1978 | Ishii et al. | 365/124 X |
| 4,198,154 | 4/1980 | Masegi et al. | 355/5 |
| 4,264,986 | 4/1981 | Willis | 365/127 X |
| 4,383,261 | 5/1983 | Goldberg | 346/1.1 |
| 4,383,262 | 5/1983 | Noguchi | 346/1.1 |
| 4,403,318 | 9/1983 | Nagashima et al. | 368/116 X |

FOREIGN PATENT DOCUMENTS

| | | |
|---|---|---|
| 107121 | 9/1976 | Japan . |
| 52-149927 | 12/1977 | Japan ................. 369/100 |
| 56-163528 | 12/1981 | Japan ................. 369/100 |
| 57-117106 | 7/1982 | Japan . |

OTHER PUBLICATIONS

Translation of JP 52-149927.
IBM Technical Disclosure Bulletin—"Recording and Erasing Apparatus for Thermoplastic Holograms", vol. 11, No. 7, Dec. 1968 pp. 734–735.
IBM Tech. Disclosure Bulletin, vol. 16, No. 2, Jul. 73; Chaudhari et al. "Optical Memory".
Radio Technology, Oct. 1976, pp. 236–237 (in Japanese).

*Primary Examiner*—Robert L. Richardson
*Attorney, Agent, or Firm*—Fitzpatrick Cella Harper & Scinto

[57] ABSTRACT

An optical recording apparatus is disclosed in which a recording medium is scanned by a beam of light to record information on the recording medium, to reproduce the recorded information and also to erase the recorded information. The beam spot formed on the recording medium for erasing has a larger spot width measured in the direction perpendicular to the scan direction than that of the beam spot for recording.

1 Claim, 3 Drawing Sheets

OPTICAL RECORDING APPARATUS HAVING IMPROVED ERASING CAPABILITY

This application is a continuation of application Ser. No. 021,554 filed Mar. 2, 1987, now abandoned, which was a continuation of application Ser. No. 739,489 filed May 30, 1985, now abandoned, which is a continuation of application Ser. No. 420,732 filed Sept. 21, 1982, now abandoned.

BACKGROUND OF THE INVENTION

1. Field of the Invention

The present invention relates to an optical recording apparatus in which a beam of light is used to record information signals on a recording medium, to reproduce the recorded signals and also to erase the recorded signals.

2. Description of the Prior Art

Optical recording apparatus are know in the art. Herein, the prior art technique for optical recording will be described in connection with the case where as the optical recording medium, a photo-magnetic disk is used.

The photo-magnetic optical recording medium is prepared by forming a magnetic film on a disk substrate. The formation of the magnetic film is carried out employing a suitable known technique such as sputtering of magnetic material. The formed magnetic film is pre-magnetized uni-directionally and vertically by applying a vertical magnetic field thereto or by another method.

The recording of information on the recording medium is carried out in the following manner:

The recording medium is rotated and a beam of light (usually a laser beam) is projected on the rotating recording medium to bring the magnetic material to the state of its magnetic transfer temperature (Curie temperature) thereby causing inversion of magnetization to form record bits spirally or in concentric circles. During the exposure of the light beam, the length of a record bit is changed in the scan direction of the recording medium (in the rotational direction of the medium) by applying a signal according to the information of the beam generator. In this manner, and through application of an appropriate magnetic field, information is recorded on the photo-magnetic disk. FIG. 1 illustrates the manner of this optical recording. In FIG. 1, reference numeral 1 designates a recording beam spot and 2 designates a record bit. The width $D_W$ of the recording beam spot measured in the direction perpendicular to the scan direction (as shown in FIG. 1) is generally in the order of 1.3 to 1.8 μm. The pitch P of record bit lines measured diametrically is in the order 2-3 times larger than $D_W$.

To reproduce the recorded information, a light beam is also projected on the recording medium at such an intensity which does not cause any inversion of magnetization of the magnetic material. During the beam exposure, the magnetized pattern is detected making use of the photo-magnetic effect thereby reading the recorded information.

When it is wished to erase the recorded information, the recording medium is rotated and a beam of light is projected on the medium in the record bit area while tracking on the record bit line. Thereby, the temperature of the exposed portion is provisionally raised up to Curie point and then the portion is cooled while applying DC bias magnetic field in the same direction as the direction of magnetization of other parts than the record bit on the recording medium. In this manner, the recorded information is erased.

According to the known method, the same beam as the recording beam is used also for erasing the recorded information. FIG. 2 illustrates the known erasing method. 1' is a recording beam spot and 2' is a record bit. The recording beam is so controlled as to run just on the record bit line. However, it has been practically impossible to make the recording beam running on the record bit line perfectly even by the highest level of control and therefore there have often occurred some offset of tracking as shown in FIG. 2. If such offset of tracking occurs, the recorded information cannot be completely erased but there remains some unerased portions 2''. These unerased portions have an adverse effect on the next recording on the same recording medium. This is an important drawback common to all of known optical recording apparatus of the type in which erasing of record bits is carried out with the same beam as used for recording. It is impossible to perfectly erase the record bits according to the prior art.

SUMMARY OF THE INVENTION

Accordingly, the object of the present invention is to provide an optical recording apparatus which is able to perfectly erase the record bits without any portion remaining unerased.

According to the invention, the object is attained by enlarging the width of the beam spot during erasing as compared with the width of the beam spot during recording. The term "width of the beam spot" herein used means the width of a beam spot focused on the above-mentioned recording medium and measured in the direction perpendicular to the direction of scanning.

Other and further objects, features and advantages of the invention will appear more fully from the following description.

DETAILED DESCRIPTION OF THE PREFERRED EMBODIMENTS

Figure 1:
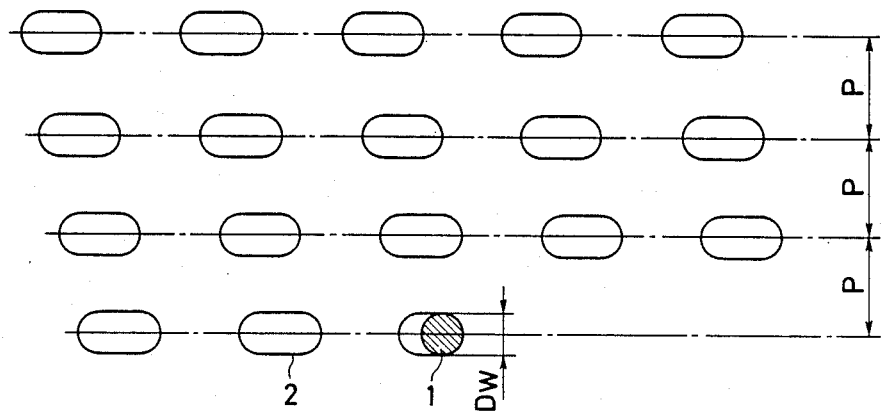
FIG. 1 illustrates the manner of information recording in an optical recording apparatus according to the prior art.
Figure 2:
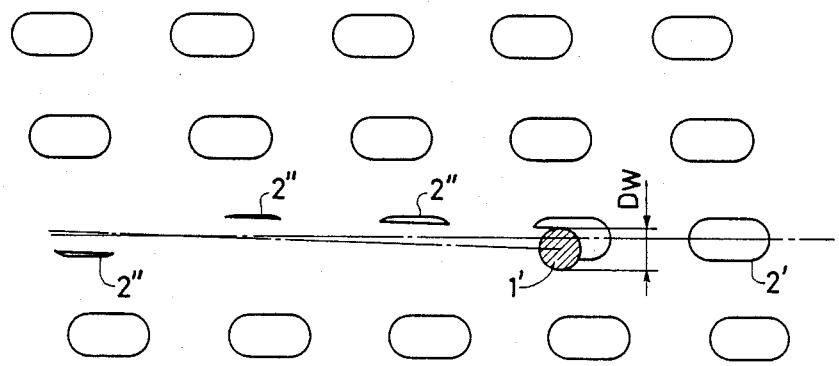
FIG. 2 illustrates the manner of erasing the recorded information in the prior art apparatus.
Figure 3:
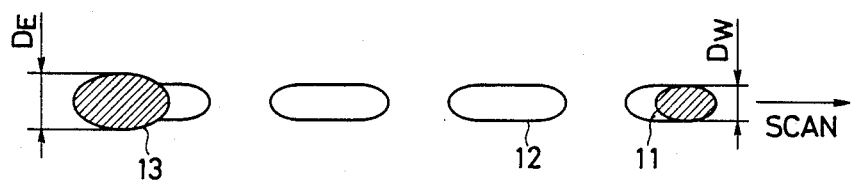
FIG. 3 illustrates the manner of erasing the recorded information in an embodiment of the present invention.

In FIG. 3 illustrating the first embodiment of the invention, 11 is a beam spot for recording, 12 is a record bit and 13 is a beam spot for erasing. $D_W$ is the width of the recording beam spot 11 and $D_E$ is the width of the erasing beam spot 13 measured in the direction perpendicular to the scan direction as shown in FIG. 3. Since the erasing beam spot 13 is so formed as to satisfy the condition of $D_E > D_W$, the beam spot 13 always covers the width of the record bit 12 in the scan direction even if there occurs some offset of tracking during the erasure. Therefore, it is assured that the record bits 12 are completely erased by the beam spot 13.

Figure 4:
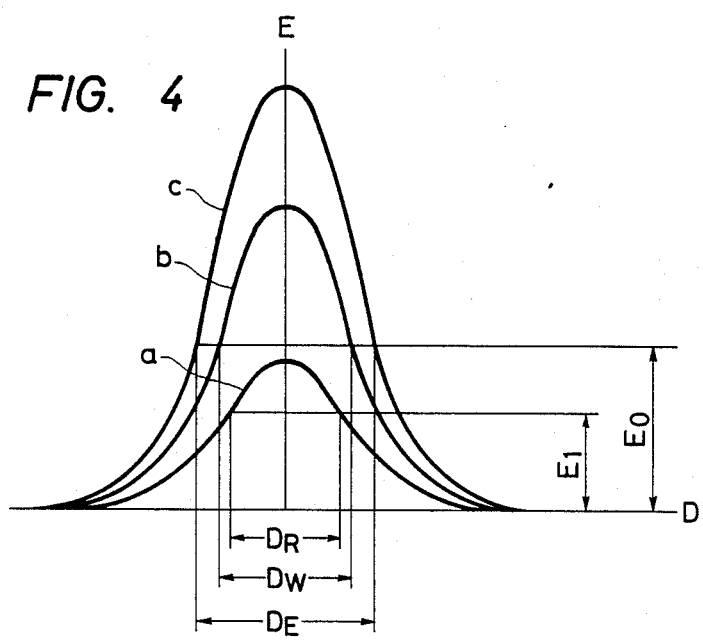
FIG. 4 is a beam width/energy distribution curve as obtained according to the invention.

FIG. 4 shows the distribution curves of energy/beam width obtained according to the invention.

In FIG. 4, the energy distribution of the beam are plotted with the beam width D measured in the direction perpendicular to the scan direction as the abscissa and the beam energy E as the ordinate. $E_0$ is the energy required to form the record bits on the recording medium. $E_1$ is the energy required to reproduce the recorded information. Of three curves shown in FIG. 4, the curve a is the energy distribution curve of the light beam at reproduction. The beam width for the energy level $E_1$ is the spot width $D_R$ at reproduction. The curve b is the energy distribution curve of the light beam at recording. The beam width for the energy level $E_0$ is the spot width $D_W$ at recording. The curve c is an energy distribution curve of the light beam satisfying the condition of $D_E > D_W$. This means that the desired spot width $D_E$ satisfying that condition can be obtained by providing an optical system which can emit a beam of light having an energy distribution as indicated by the curve c during the time of erasing. The desired spot $D_E$ may be obtained also by power-up of the recording or reproducing light beam to the level of the energy distribution curve c during the period of erasing.

Figure 5:
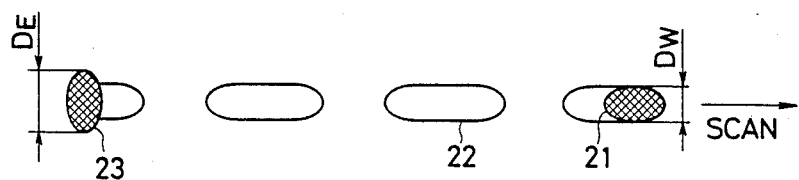
FIG. 5 illustrates the manner of erasing the recorded information in a second embodiment of the invention.

FIG. 5 illustrates a second embodiment of the invention.

21 is a beam spot for recording. 22 is a record bit and 23 is a beam spot for erasing. In this embodiment, the beam spot for recording is used also for erasing but with a relation 90° rotated relative to the beam spot used for recording. As seen from FIG. 5, the beam spot used in the second embodiment is not circular but elliptical. For recording, the elliptical beam spot is used with the minor axis being the beam width $D_W$ in the direction perpendicular to the scan direction. For erasing, the elliptical beam spot is rotated 90° and used with the major axis being the spot width $D_E$ in the direction perpendicular to the scan direction. Therefore, the condition of $D_E > D_W$ can be satisfied also in this embodiment.

Figure 6A:
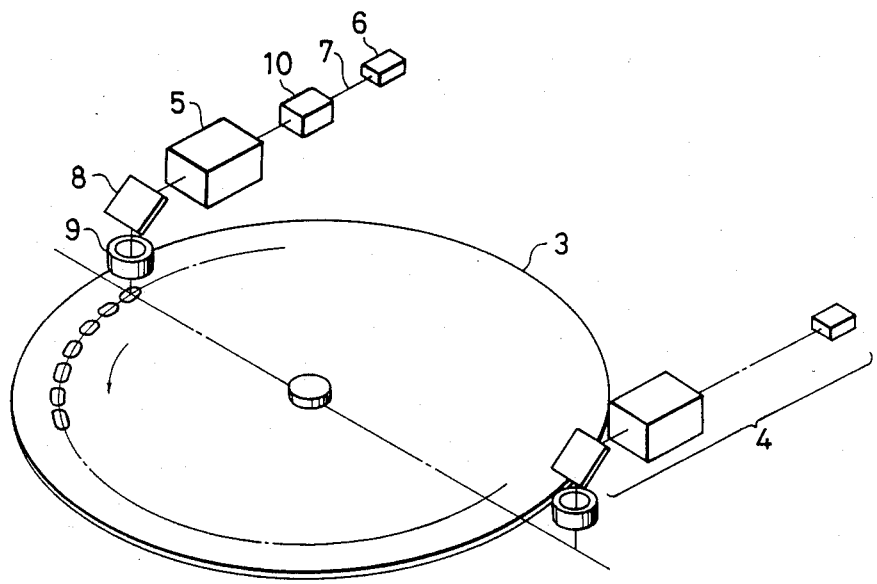
FIGS. 6A and 6B are perspective views showing the actual arrangement of the second embodiment.
Figure 6B:
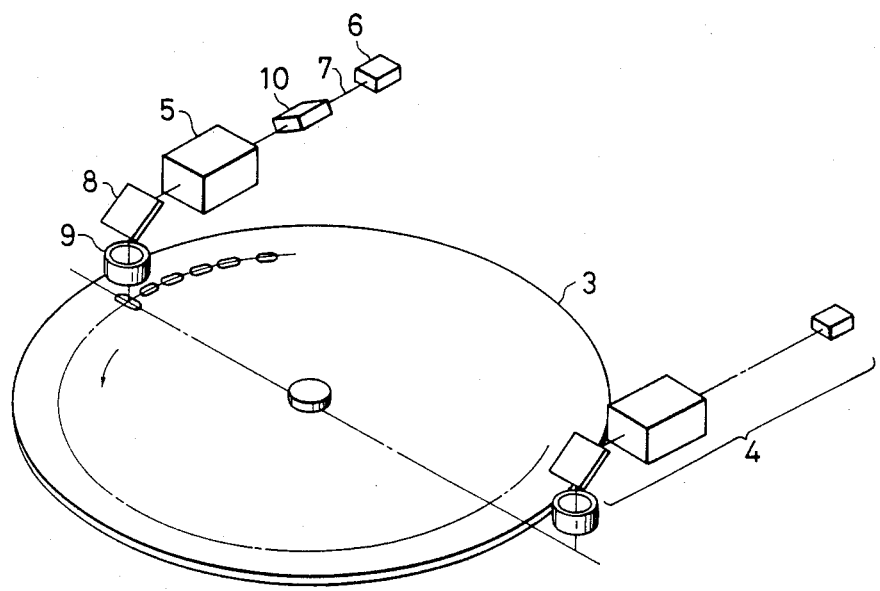

FIGS. 6A and 6B show the actual arrangement of the second embodiment.

In FIGS. 6A and 6B, 3 is a recording medium, 4 is an optical system for reproduction, 5 is a control unit and 6 is a laser unit. The laser beam 7 emitted from the laser unit 6 is focused on the recording medium 3 through a mirror 8 and a lens 9. In the path of the laser beam 7 there are interposed a trapezoidal prism 10 and the control unit 5 including an autofocusing device, a tracking device etc.

FIG. 6A shows the apparatus in the position for recording. In this position, the elliptical laser beam spot forms record bits on the recording medium 3 with the minor axis of the ellipse being the spot width in the direction perpendicular to the scan direction.

FIG. 6B shows the apparatus in the position for erasing. In this position, the trapezoidal prism 10 is rotated 45° about the optical axis of the laser beam 7 so that the beam spot is rotated 90° relative to the position for recording. Therefore, for erasing the record bit line, the elliptical spot scans the record bits with its major axis being the spot width in the direction perpendicular to the scan direction. As the spot width is larger than the width of the record bit, the record bit line can be completely erased by the beam spot even when there occurs some amount of offset of tracking.

In this manner, according to the invention, the record bits are completely erased in an optical recording apparatus. This is a particular effect of the invention.

While the present invention has been particularly shown and described with reference to some embodiments wherein a photomagnetic disk has been used as the recording medium, it is to be understood that the present invention is applicable to all of such optical recording apparatus in which a beam of light is projected on a recording medium to change the state of the medium and in which not only the recording of information but also the erasing of the recorded information are carried out using a beam of light.

What I claim is:

1. An optical recording apparatus for recording information on a magneto-optical recording medium having an original magnetization by applying a light beam to raise the temperature of the recording medium to approximately the Curie temperature in the presence of a DC bias magnetic field and causing inversion of magnetization in a portion of the recording medium at which the light beam is applied, and for erasing the recording medium by applying a light beam to raise the temperature of the recording medium to approximately the Curie temperature in the presence of a DC bias magnetic field and returning the magnetization in said portion to the original magnetization, wherein the threshold energy for erasure is the same as the threshold energy for recording, wherein said apparatus comprises:

a light source for emitting a light beam;

means for projecting the light beam emitted by said light source onto the magneto-optical recording medium as a beam spot;

means for scanning the recording medium with the beam spot; and means for changing the power of the light beam emitted by said light source in such a manner that the amount of peak energy given to the recording medium by the light beam at the time of erasure is larger than that at the time of recording, so that the width of the beam spot, defined by said threshold energy, is larger at the time of erasure than at the time of recording.

* * * * *

UNITED STATES PATENT AND TRADEMARK OFFICE
CERTIFICATE OF CORRECTION

PATENT NO. : 4,953,150

DATED : August 28, 1990

INVENTOR(S) : HIRAKU SONOBE

It is certified that error appears in the above-identified patent and that said Letters Patent is hereby corrected as shown below: Title page:

AT [56] REFERENCES CITED

Foreign Patent Documents, insert
--52-46464  11/1977  Japan..........369/13
--56-16950   2/1981  Japan..........369/13--.

Other Publications, insert
--Soviet Journal of Quantum Electronics, Karnatovskii et al.; "Reversible Recording of Holograms on Glossy Chalcogenide Semiconductors at Elevated Temperatures"; vol. 6, No. 1, Jan. 1976, p. 121-123.--.

Signed and Sealed this

Fourth Day of February, 1992

Attest:

HARRY F. MANBECK, JR.

*Attesting Officer*   *Commissioner of Patents and Trademarks*